United States Patent [19]
Obara

[11] Patent Number: 5,789,835
[45] Date of Patent: Aug. 4, 1998

[54] POSITIONING APPARATUS

[75] Inventor: Kouji Obara, Kanagawa, Japan

[73] Assignee: Nippon Thompson Co., Ltd., Tokyo, Japan

[21] Appl. No.: 786,927

[22] Filed: Jan. 23, 1997

[30] Foreign Application Priority Data

Mar. 8, 1996 [JP] Japan ................................. 8-080539

[51] Int. Cl.$^6$ ................................................. B23Q 5/00
[52] U.S. Cl. .......................... 310/80; 310/98; 74/424.8 R; 74/424.8 B
[58] Field of Search ............................ 310/114, 80, 83, 310/98, 99; 74/424.8 B, 424.8 R; 318/114, 115

[56] References Cited

FOREIGN PATENT DOCUMENTS 6-46552  2/1994  Japan.

*Primary Examiner*—Steven L. Stephan
*Assistant Examiner*—Judson H. Jones
*Attorney, Agent, or Firm*—Sughrue, Mion, Zinn, Macpeak & Seas, PLLC

[57] ABSTRACT

The present invention discloses a positioning apparatus that, together with rotating an object (driven object), positions and guides said object to an arbitrary position within its rotating plane. This positioning apparatus can easily be made compact in size and its rotary motion is not restricted by a power supply cord and so forth. The above-mentioned effects are obtained by arranging a driving force generation device, more specifically a motor, which generates driving force to be applied to a linear motion table of a linear motion table mechanism, within the base portion of a rotary table mechanism.

5 Claims, 10 Drawing Sheets

POSITIONING APPARATUS

BACKGROUND OF THE INVENTION

1. Field of the Invention

The present invention relates to a positioning apparatus that, together with rotating an object (driven object), positions and guides said object to an arbitrary position within its rotating plane.

2. Description of the Prior Art

In recent years, rotary table apparatuses that drive by guiding rotary motion or single shaft linear table apparatuses that drive by guiding linear motion, have come to be widely used accompanying the growth of the electronics industry. However, there is currently a need for a positioning apparatus that positions by guiding both rotary motion and linear motion together. Under the present circumstances, a constitution indicated in FIGS. 1 and 2 is employed for performing this type of operation.

As shown in the drawings, a single shaft linear motion table apparatus 2 is mounted on rotary table apparatus 1. The constitution of this rotary table apparatus 1 is as disclosed in Japanese Patent Laid-Open Publication No. 6-46552, and schematically has roughly cylindrical base portion 4 and rotary table 5 inserted into said base portion 4 so as to rotate freely.

The above-mentioned base portion 4 has inner housing 4b and outer housing 4c concentrically assembled on housing base 4a. Inner stator 7 and outer stator 8, each containing coils, are installed so as to mutually correspond on said inner housing 4b and outer housing 4c, respectively.

Rotor 9 is arranged between the above-mentioned inner stator 7 and outer stator 8, and said rotor 9 is fastened to rotary table 5. Inner stator 7, outer stator 8 and rotor 9 compose a motor that rotates rotary table 5.

Furthermore, rotary table apparatus 1 is equipped with an encoder (not shown) for detecting the amount of rotation of said motor.

On the other hand, single shaft linear motion table apparatus 2 is composed as described below.

Namely, said linear motion table apparatus 2 has long base portion 12, linear motion table 13 that is attached to said base portion 12 so as to reciprocate freely by performing linear motion in the lengthwise direction, and motor 15 that generates the driving force for reciprocating said linear motion table 13.

As is clear from FIG. 1, long threaded shaft 17 is provided within the above-mentioned base portion 12, and is attached to said base portion 12 at both of its ends by means of bearings 18 while allowing to rotate freely. Said threaded shaft 17 is coupled to output shaft 15a of the above-mentioned motor 15 by coupling 20. Nut 21 is provided that screws onto this threaded shaft 17, and said nut 21 is fastened to the above-mentioned linear motion table 13.

A transmission device that transmits the driving force of motor 15 to linear motion table 13 is composed by threaded shaft 17, bearings 18, coupling 20 and nut 21. In other words, when motor 15 rotates, threaded shaft 17 rotates, and as a result of nut 21 reciprocating along said threaded shaft 17, linear table 13 reciprocates.

Furthermore, single shaft linear motion table apparatus 2 is equipped with an encoder (not shown) for detecting the position of linear motion table 13.

In the positioning apparatus having the above-mentioned constitution, rotary table 5 is rotated to a desired angular position (indicated with arrow R in FIG. 1) according to feedback control based on a detection signal from the encoder equipped on rotary table apparatus 1, and linear motion table apparatus 2 is positioned at said angular position.

In addition, linear motion table 13 performs linear motion (indicated with arrow S) and is driven to a desired position within the rotating plane by the operation of motor 15 of linear motion table apparatus 2 before, after or simultaneous to this rotation operation.

As has been described above, the position apparatus of the prior art simply consists of combining respectively independent apparatuses in the form of rotary table apparatus 1 and linear motion table apparatus 2.

In said constitution, motor 15 equipped on linear motion table apparatus 2 is installed on and protrudes from the end of base portion 12, which presents a problem in terms of attempting to reduce the overall size of the apparatus.

In addition, as shown in FIG. 2, since a cord 23 for supplying power to this motor 15 is extending from the apparatus, although this does not present a problem in the case of linear motion table apparatus 2 performing oscillating motion, when said linear motion table apparatus 2 performs rotary motion, a problem results since this cord 23 ends up becoming entangled. In addition, a similar problem occurs with respect to a cord (not shown) for obtaining signals from the encoder equipped on linear motion table apparatus 2.

Furthermore, the transmission device equipped on linear motion table apparatus 2 of the above-mentioned positioning apparatus of the prior art is of a form in which nut 21 screws onto threaded shaft 17. A transmission method that uses a belt may also be employed, however. Although not shown in the drawings, this belt transmission method consists of respectively arranging belt pulleys near the vicinity of both ends of base portion 12 of the above-mentioned linear motion table apparatus 2, wrapping an endless toothed belt around these belt pulleys, and applying a driving force provided by a motor to one of the belt pulleys resulting in driving of said belt. The above-mentioned linear motion table that is coupled to this belt is then reciprocated by the driving of the belt.

In addition, this belt transmission method also has problems similar to those described above.

SUMMARY OF THE INVENTION

In consideration of the above-mentioned problems, the object of the present invention is to provide a positioning apparatus that can easily be made compact and does not restrict rotary motion.

In addition, the present invention provides a positioning apparatus that is also able to demonstrate other effects.

In order to achieve the above-mentioned object, the positioning apparatus according to the present invention is equipped with a rotary table mechanism and a linear motion table mechanism; said rotary table mechanism having a first base portion, a rotary table inserted into said first base portion so as to rotate freely, and a driving device that rotates said rotary table; and said linear motion table mechanism having a second base portion, a linear motion table attached to said second base portion that performs linear motion so as to reciprocate freely, a driving force generation device that generates driving force for reciprocating said linear motion table, and a transmission device that transmits said driving force to said linear motion table; wherein, said second base portion is mounted on said rotary table, and said driving force generation device is arranged within said first base portion.

In addition, the positioning apparatus according to the present invention is equipped with a rotary table mechanism and a linear motion table mechanism, and comprises a driving device that rotates said rotary table, a first encoder that detects the amount of rotation and so forth of said rotary table, a driving force generation device that generates driving force for reciprocating said linear motion table of said linear motion table mechanism, a second encoder that detects the amount of rotation and so forth of said driving force generation device, a signal generation device that generates signals for driving said driving device and said driving force generation device, and a frequency conversion device that converts the signals generated from said signal generation device for driving said driving device into signals corresponding to the resolution of said second encoder.

In this positioning apparatus, the above-mentioned rotary table rotates by the operation of the above-mentioned driving device, while the above-mentioned linear motion table reciprocates by the driving force from the above-mentioned driving force generation device.

DESCRIPTION OF THE PREFERRED EMBODIMENTS

The following provides an explanation of the embodiments of the present invention while referring to the attached drawings.

Figure 3:
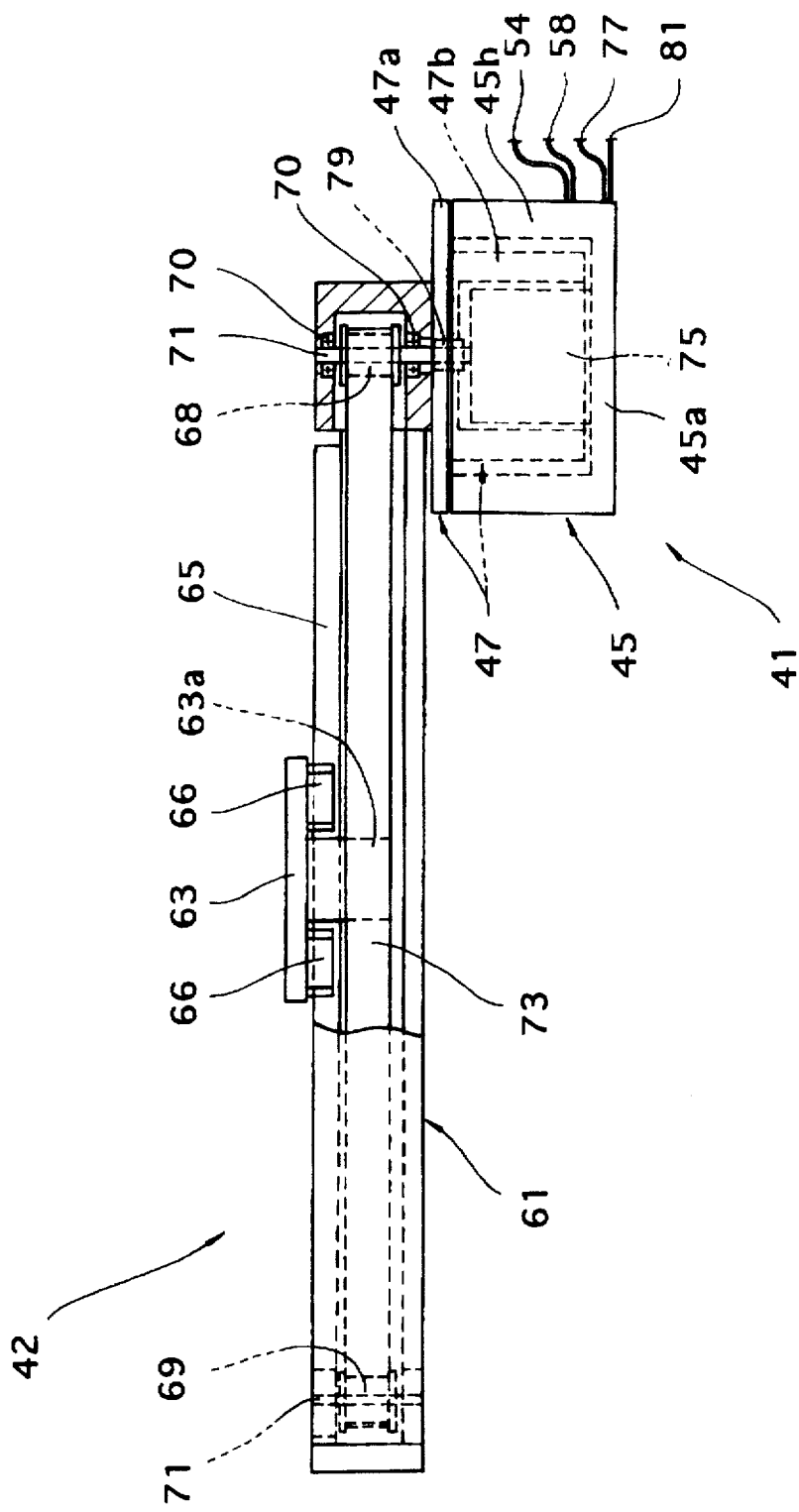
FIG. 3 is a front view, including a partial cross-section, of a positioning apparatus as a first embodiment of the present invention.
Figure 4:
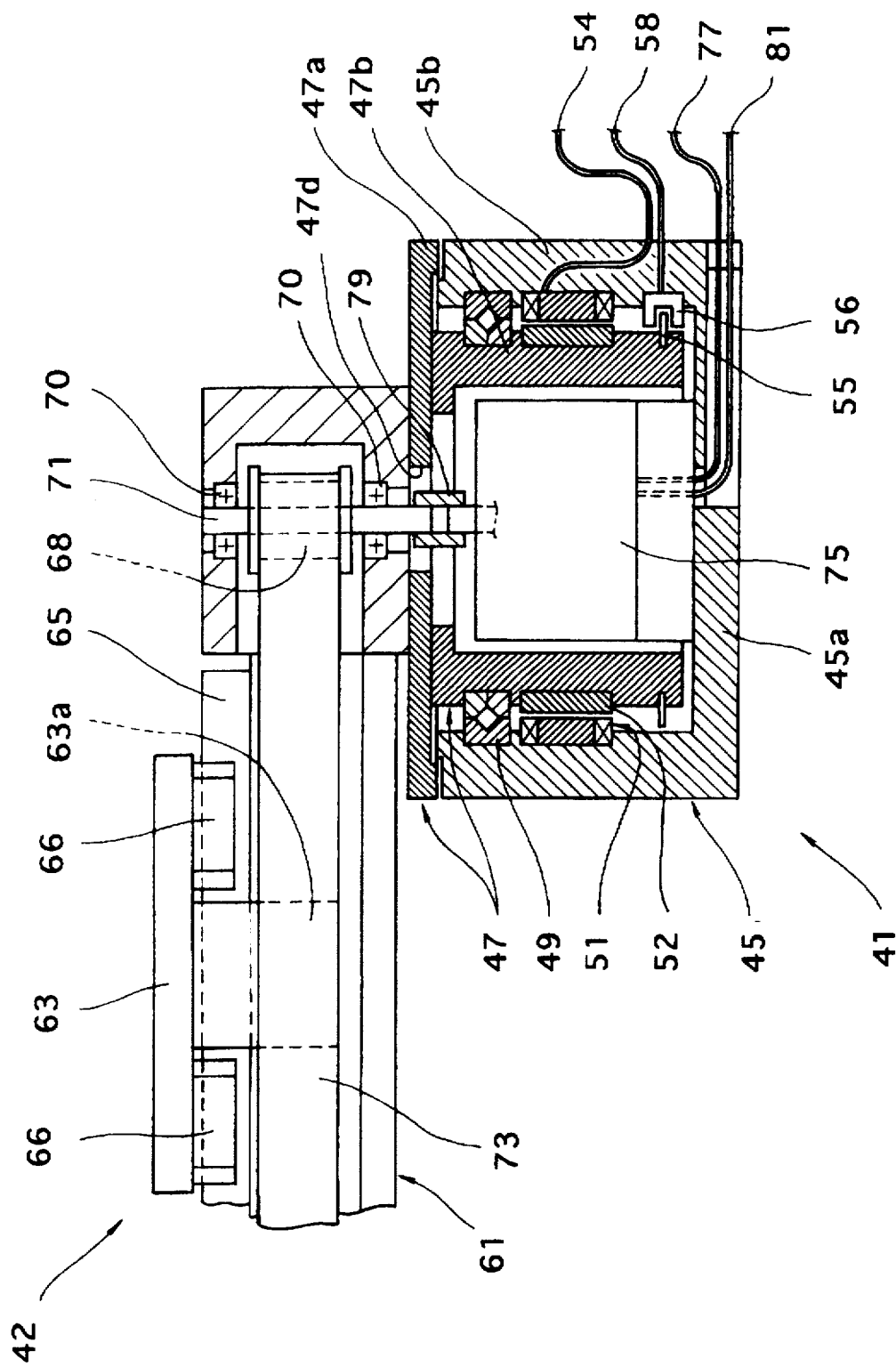
FIG. 4 is a longitudinal cross-sectional view of the essential portion of the positioning apparatus shown in FIG. 3.

A positioning apparatus as a first embodiment of the present invention is shown in FIGS. 3 and 4.

As shown in the drawings, said positioning apparatus is equipped with rotary table mechanism 41 and linear motion table mechanism 42 mounted on said rotary table mechanism 41.

Rotary table mechanism 41 has base portion 45 which is formed into a roughly cylindrical shape and of which one end is roughly occluded. The open end of said base portion 45 is on top. Said base portion 45 integrates, for example, bottom portion 45a and peripheral wall portion 45b into a single unit.

Rotary table 47 is inserted into this base portion 45. Said rotary table 47 is a combination of disk-shaped support portion 47a and cylindrical portion 47b, and said cylindrical portion 47b is inserted into base portion 45.

The above-mentioned rotary table 47 is supported by base portion 45 so as to rotate freely. More specifically, crossed roller bearings 49 are juxtapositioned between cylindrical portion 47b of said rotary table 47 and peripheral wall portion 45b of base portion 45. These crossed roller bearings incorporate a plurality of rollers, which have identical diameter and length and arranged so that center shaft of each roller crosses that of adjacent roller, between track grooves having a V-shaped cross section formed in the inner ring and outer ring of the crossed roller bearing so as to correspond each other. These bearings rotate and guide objects, and they are able to independently bear radial loads, axial loads and moment loads. In said positioning apparatus, since linear motion table mechanism 42 operates while mounted on rotary table 47 in cantilever fashion, this composite load is applied to the bearings. However, as a result of employing the above-mentioned crossed roller bearings that are able to bear this composite load individually, the number of parts of the entire apparatus can be reduced enabling the apparatus to be made more compact.

A stator 51 containing coils is attached to the inside of peripheral wall portion 45b of the above-mentioned base portion 45. A rotor 52, comprising a permanent magnet, is attached to the outside of cylindrical portion 47b of rotary table 47 corresponding to this stator 51. These stator 51 and rotor 52 comprise a motor that rotates rotary table 47, namely a driving device.

In the case of the present embodiment, said motor is a direct drive type motor that does not have a speed reducer, and particularly, is a direct current brushless motor. The above-mentioned stator 51 is provided with a plurality of armature coils each wrapped in the shape of a ring in a row in the peripheral direction of base portion 45, while rotor 52 is magnetized by multiple magnetic poles so that different magnetic poles are alternately arranged in a row in the circumferential direction. In this constitution, by supplying a prescribed excitation current to each armature coil, torque is produced between the primary side in the form of stator 51 and the secondary side in the form of rotor 52 based on Fleming's left-hand rule. This serves as the driving force that rotates rotary table 47. In the drawings, the cord for supplying this excitation current is indicated with reference numeral 54.

Furthermore, although a brushless motor is used in the present embodiment, other motors such as an alternating current pulse motor and so forth may also be employed.

An encoder is provided for detecting the amount of rotation and so forth of the above-mentioned direct current brushless motor. This encoder is composed of a detected portion in the form of address plate 55 shown in FIG. 4, and a detecting portion in the form of sensor 56 that corresponds to said detected portion. Address plate 55 is formed into the shape of a ring, and is attached near the bottom of cylindrical portion 47b of rotary table 47. In addition to a large number of slits (not shown) being formed at a fine and equal pitch along the circumferential direction, a slit is also formed at a prescribed position for the origin signal. Sensor 56 is attached to base portion 45 corresponding to said address plate 55, and is equipped with three transmission type photocouplers, with one of these photocouplers used to detect the slit for the origin signal, and the other two photocouplers acting to detect each of the above-mentioned large number of slits.

Namely, the signals obtained when passing over each of the slits formed at an equal pitch while using the above-mentioned slit for the origin signal as the reference position are counted to obtain the amount of rotation and so forth. In the drawings, the cord for obtaining the detection signals from each photocoupler is indicated with reference numeral 58.

In addition, two of the photocouplers provided to detect the above-mentioned large number of slits are arranged to be shifted in the direction of pitch by ½ said pitch relative to the other photocoupler. As a result of this constitution, signals of two phases A and B are obtained that can be used for discrimination of the direction of rotation.

Furthermore, although an incremental type of encoder is used in the present embodiment as described above, an absolute type of encoder can naturally also be employed.

On the other hand, linear motion table mechanism 42 mounted on the above-mentioned rotary table mechanism 41 is composed in the manner described below.

Namely, said linear motion table mechanism 42 has a long base portion 61, and a linear motion table 63 that performs linear motion in the lengthwise direction and is attached to said base portion 61 so as to reciprocate freely. Said linear motion table mechanism 42 is mounted on the above-mentioned rotary table 47 at one end of this base portion 61, namely in cantilever fashion.

Furthermore, this base portion 61 is referred to as the second base portion within the overall constitution of said positioning apparatus. In contrast, roughly cylindrical base portion 45 equipped on rotary table mechanism 41 is referred to as the first base portion.

The above-mentioned linear motion table 63 is guided by a linear motion guide unit composed of track rail 65 and slide units 66. This track rail 65 is fixed extending along said lengthwise direction of base portion 61, and track grooves (not shown) is formed over its entire length in both sides. In contrast, slide units 66 are attached to the lower surface of linear motion table 63, are juxtaposed about said track rail 65, and have a rolling element circulating path in which a large number of rolling elements in the form of balls that are arranged and housed corresponding to said track grooves. According to this constitution, said slide units 66 reciprocate along track rail 65, and each of said balls roll and circulate within said rolling element circulating path. Consequently, said balls roll along the track grooves of track rail 65 resulting in extremely smooth movement of linear motion table 63.

Linear motion table 63 is reciprocated by a linear motion driving device having the constitution described below.

Namely, a pair of toothed belt pulleys 68 and 69 are attached to spindles 71 axially supported by means of bearings 70 on the above-mentioned base portion 61 near both ends in the lengthwise direction on said base portion 61.

Toothed belt 73 is wrapped around both toothed belt pulleys 68 and 69. Coupling 63a provided protruding from the lower side of linear motion table 63 is coupled to this toothed belt 73.

A space is provided inside base portion 45 of the above-mentioned rotary table mechanism 41, and more specifically, within cylindrical portion 47b of rotary table 47. A driving force generation device in the form of a motor for generating driving force for reciprocating the above-mentioned linear motion table 63, and in this case a direct drive type of direct current brushless motor 75, is arranged within this space. It goes without saying that this direct current brushless motor 75 is composed basically in the same manner as the previously described direct current brushless motor (composed of stator 51 and rotor 52) provided for rotating rotary table 47. A stator serves as the power supply side in this direct current brushless motor 75 as well. A cord for supplying excitation current to each of the armature coils in this stator is indicated with reference numeral 77.

One of the toothed belt pulleys 68 provided on base portion 61 that serves as the driving side is coupled by means of coupling 79 with output shaft 75a of the above-mentioned direct current brushless motor 75 to spindle 71 on which it is attached. This coupling is performed by inserting into circular opening 47d formed in support portion 47a of rotary table 47.

A transmission device that transmits the driving force generated by the above-mentioned direct current brushless motor 75 to linear motion table 63 is composed by this coupling 79, both toothed belt pulleys 68 and 69, spindles 71, toothed belt 73 and so forth.

An encoder (not shown) for detecting the amount of rotation and so forth of the above-mentioned direct current brushless motor 75 is also provided in said motor 75. It is composed in the same manner as the encoder provided in the motor for rotating and driving the above-mentioned rotary table 47 (composed of address plate 55 and sensor 56). In addition, a detecting portion in the form of a sensor is provided on the stationary side that contains said encoder. The cord for obtaining detection signals from three photocouplers equipped on this sensor is indicated with reference numeral 81.

Figure 5:
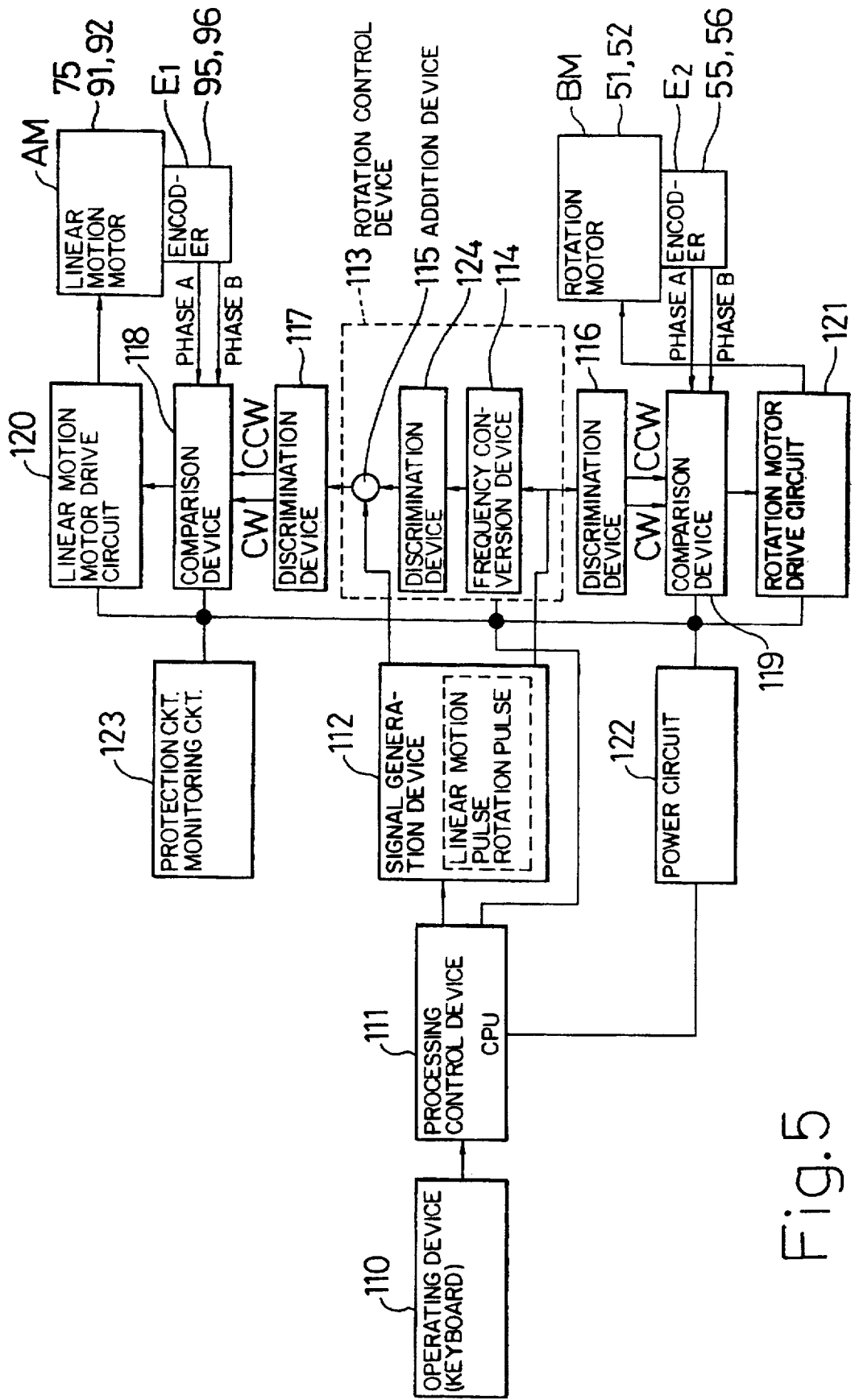
FIG. 5 is a block diagram showing the operational control system of the positioning apparatus shown in FIGS. 3 and 4.

Here, an explanation is provided of the operation of said linear motion driving device along with the constitution of the control system that controls its operation based on FIG. 5.

As shown in FIG. 5, an operating device in the form of keyboard 110 is for setting commands and so forth for each section. The commands and so forth set by this operating device 110 are supplied to a processing control device in the form of CPU 111. This CPU 111 is composed of a microprocessor and so forth, and stores or reads necessary data to and from memory devices in the form of RAM, ROM and so forth (not shown) which is then sent to signal generation device 112.

This signal generation device 112 fulfills the role of a pulse generator, forming and generating pulses for driving linear motion motor AM composed with direct current brushless motor 75 and so forth, and for driving rotation motor BM composed with stator 51 and rotor 52, namely linear motion pulses and rotation pulses, respectively. In FIG. 5, these motors are indicated with the letters AM and BM, respectively, for the sake of explanation.

Although the above-mentioned signal generation device 112 is for forming and generating digital signals in the form of linear motion pulses and rotation pulses, it may also be composed so as to generate analog signals. In this case, it is necessary to suitably provide a waveform shaping circuit and A/D conversion circuit and so forth in rotation control device 113 of the following stage.

The linear motion pulses and rotation pulses from the above-mentioned signal generation device 112 are supplied to rotation control device 113. This rotation control device 113 is composed of frequency conversion device 114, discrimination device 124 and addition device 115. Rotation pulses emitted by the above-mentioned signal generation device 112 are supplied to discrimination device 116 and frequency conversion device 114. Rotation pulses supplied to frequency conversion device 114 are discriminated by discrimination device 124, added to the linear motion pulses by addition device 115 and supplied to discrimination device 117.

Furthermore, although the signal path shown in FIG. 5 is indicated with arrows and so forth, reference signals and so forth are also included in these arrows in addition to the inherent pulse signals as described above. These signals are not shown in the circuit, however.

Discrimination device 117 discriminates whether the signals are clockwise or counter-clockwise signals according to the direction command signal from signal generation device 112, and then supplies the signals to comparison device 118. In FIG. 5, clockwise signals from discrimination device 117 are indicated with the letters CW, while counter-clockwise signals are indicated with the letters CCW.

In this case, although clockwise pulses use pulses produced by positive voltage, while counter-clockwise pulses use negative voltage, other methods may be used as is appropriate.

The constitutions of discrimination device 117 and comparison device 118 are the same as the constitutions of discrimination device 116 and comparison device 119 to which rotation pulses are supplied.

Next, the above-mentioned comparison device 118 is composed of a deviation counter. Signals from this comparison device 118 are supplied to linear motion motor drive circuit 120. Linear motion motor AM is driven by this linear motion motor drive circuit 120. The amount of rotation, rotating speed and reference position of this linear motion motor AM are detected by encoder $E_1$ and phase A, phase B and reference signals are obtained from said encoder $E_1$ that are supplied to the above-mentioned comparison device 118.

In addition, since the above-mentioned comparison device 118 is composed with a deviation counter, it operates so as to control linear motion motor drive circuit 120 so that the difference is zero as a result of comparing the command signal to linear motion motor drive circuit 120 and the signal fed back from encoder $E_1$ according to a command from the discrimination device.

The operation of this comparison device 118 and so forth is composed in the same manner as rotation motor BM, encoder $E_2$ and rotation motor drive circuit 121. Furthermore, the letters $E_1$ and $E_2$ shown in FIG. 5 are used for the sake of explanation.

However, although it has been previously described that rotation control device 113 in the positioning apparatus as claimed in the present invention is composed of frequency conversion device 114, discrimination device 124 and addition device 115, the linear motion pulses and rotation pulses from signal generation device 112 that are supplied to this rotation control device 113 are set corresponding to the respective resolutions of linear motion motor AM and rotation motor BM.

Namely, linear motion pulses are signals required for rotation of linear motion motor AM in order to position linear motion table 63, and are set corresponding to the resolution of the linear motion motor.

Similarly, rotation pulses are also signals required for positioning of rotary table 47, and are set corresponding to the resolution of the rotation motor.

Thus, although the resolutions of encoder $E_1$ and encoder $E_2$ are different, the resolutions of encoder $E_1$ and encoder $E_2$ may also be the same.

As shown in FIGS. 3 and 4, in the positioning apparatus as claimed in the present invention, linear motion table mechanism 42 is mounted on rotary table mechanism 41, and a driving force generation device in the form of linear motion motor 75 is contained within rotary table mechanism 41.

Thus, in the case rotation motor BM operates, rotary table 47 rotates and base portion 61 fixed on rotary table 47 also rotates resulting in operation of linear motion table 63. In other words, the driving force (rpm) for rotation is superimposed on the driving force (rpm) for linear motion motor AM thus resulting in positioning of linear motion table 63 not being performed accurately. Therefore, in order to eliminate the effect of the driving force of this superimposed rotary table mechanism 41 so that positioning of linear motion table 63 is performed accurately, the positioning apparatus as claimed in the present invention is composed so that control is performed by rotation control device 113.

Next, the following provides an explanation of the action of this rotation control device 113.

In the case rotation motor BM operates, or in the case linear motion motor AM and rotation motor BM operate simultaneously, rotation control device 113 performs control so that the rotational element of rotary table mechanism 41 does not affect positioning of linear motion table mechanism 42.

As was previously described, in the case of the resolutions of encoder $E_1$ and $E_2$ being different, since the numbers of linear motion pulses and rotation pulses per rotation emitted from signal generation device 112 are different, frequency conversion device 114 synchronizes the pulses by performing conversion so that the number of rotation pulses equals the number of linear motion pulses.

Since the number of rotation pulses are converted to equal the number of linear motion pulses by frequency conversion device 114, in the case the rotation of rotary table mechanism 41 and rotation of linear motion motor AM of linear motion table mechanism 42 are in the same direction, addition device 115 subtracts the converted number of rotation pulses, while conversely, in the case rotation is in the opposite direction, addition device 115 adds the converted number of rotation pulses.

Due to the action of this rotation control device 113, the positioning apparatus as claimed in the present invention is able to accurately and respectively position rotary table mechanism 41 and linear motion table mechanism 42.

In addition, since the resolution of encoder $E_1$ can be confirmed in advance, the positioning apparatus as claimed in the present invention is composed so that changing of the setting of frequency conversion device 114 composed with a microcomputer and so forth can be suitably performed by operating device 110 corresponding to that resolution.

Thus, encoders having, for example, a resolution of two times or four times the resolution of $E_1$, or conversely, those having a resolution of ½ or ¼ times the resolution of $E_1$ can be easily set and used.

Next, the following provides an explanation of the flow with respect to operating device 110, processing control device 111, signal generation device 112 and rotation control device 113 shown in FIG. 5.

First, the operator performs various settings for positioning rotary table mechanism 41 and linear motion table mechanism 42 using operating device 110 in the form of a keyboard. Operation is then started by pressing a start button not shown after setting has been performed.

Next, processing control device 111 reads required data specified by setting from operating device 110 from memory and sends a command to signal generation device 112. Signal generation device 112 then forms linear motion pulses and rotation pulses together with a rotation direction command signal and supplies them to rotation control device 113.

After the rotation pulses are converted so as to equal the number of linear motion pulses by frequency conversion device 114, rotation control device 113 supplies the signals to discrimination device 124. Discrimination device 124 discriminates the directions of rotation of linear motion motor AM and rotation motor BM, in the case the directions of rotation are the same, supplies a pulse that decreases the number of rotation pulses relative to the number of linear motion pulses to addition device 115. Conversely, if the directions of rotation are opposite, a pulse is supplied to addition device 115 that increases the number of rotation pulses relative to the number of linear motion pulses.

In addition, since rotation pulses are not generated when the rotation motor is stopped, pulses are naturally not supplied to addition device 115.

Control of linear motion motor AM and rotation motor BM is performed according to the flow as described above. Furthermore, an explanation of the control of linear motion motor drive circuit 120 and rotary motor drive circuit 121 and so forth is omitted since it has already been provided.

Next, power circuit 122 is for supplying electrical power to each component indicated in FIG. 5. In addition, protection circuit and monitoring circuit 123 are circuits for protecting each of the circuits shown in FIG. 5 and determining whether their operation is normal or abnormal. This protection circuit and monitoring circuit 123 performs, for example, monitoring of excessive current supplied to linear motion motor AM or abnormalities in its rotation and so forth.

Figure 1:
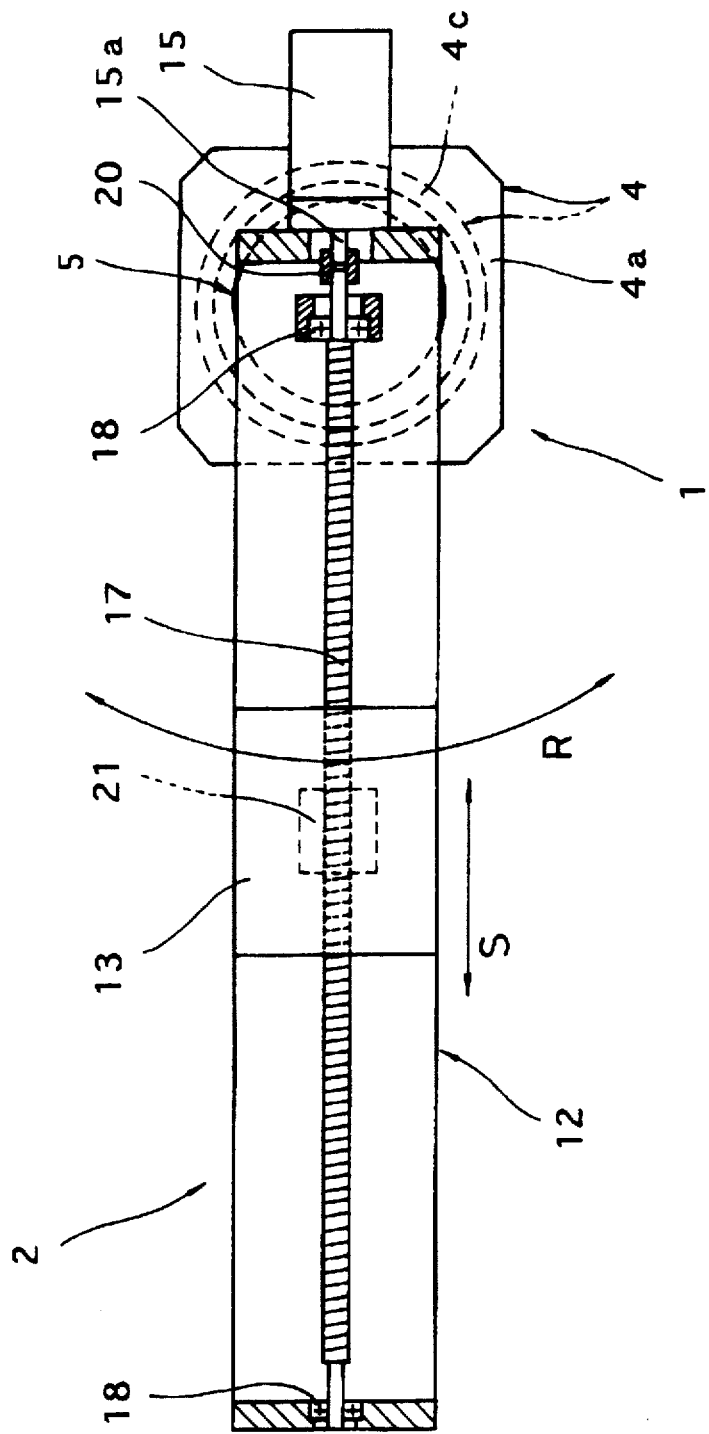
FIG. 1 is an overhead view, including a partial cross-section, of the positioning apparatus of the prior art.
Figure 2:
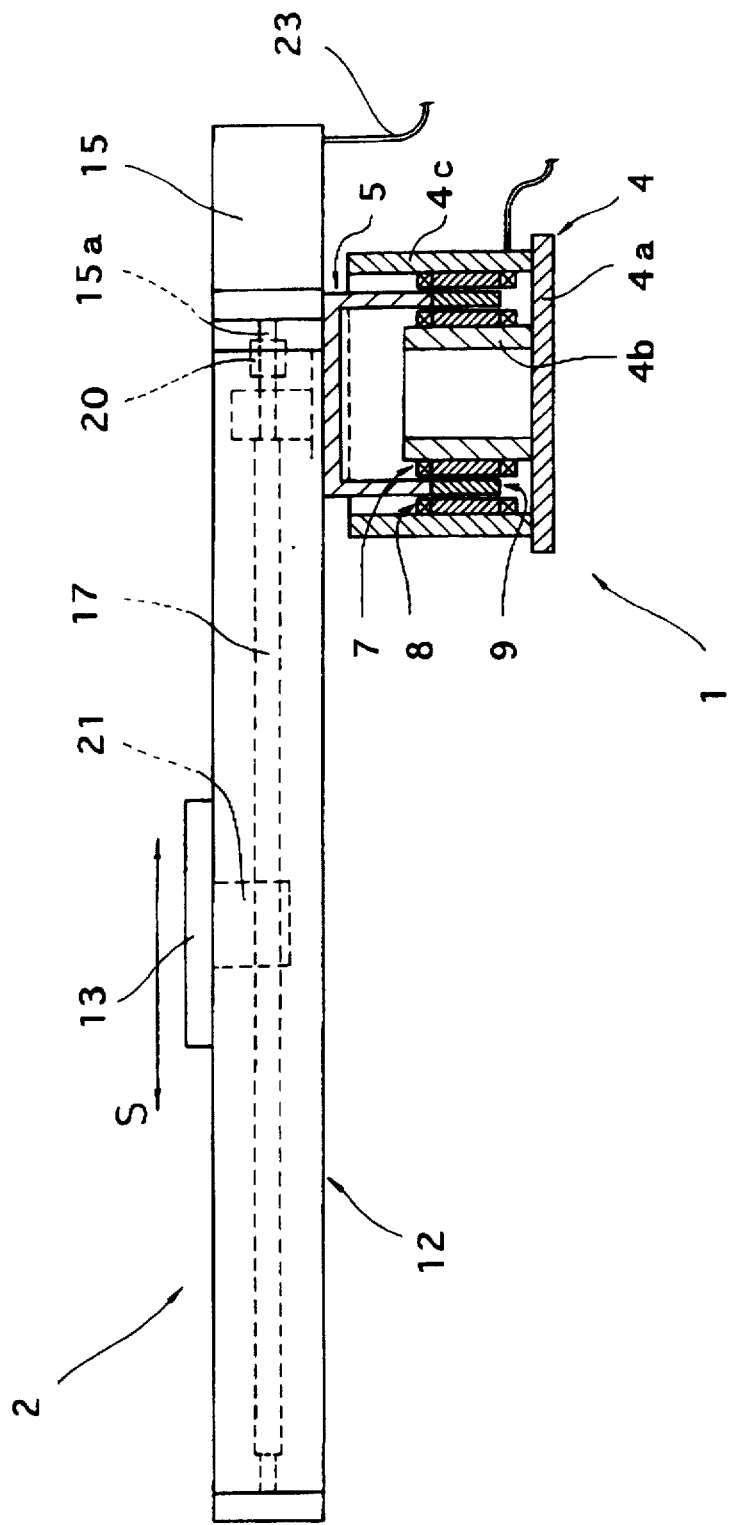
FIG. 2 is a front view, including a partial cross-section, of the positioning apparatus shown in FIG. 1.

As is clear from the explanation provided thus far, in said positioning apparatus, a driving force generation device in the form of direct current brushless motor 75 that generates driving force to be applied to linear motion table 63 of linear motion table mechanism 42 is arranged within base portion 45 of rotary table mechanism 41. Accordingly, a motor does not protrude from the end of a linear motion table mechanism as in the example of the prior art shown in FIGS. 1 and 2, thereby making it easier to reduce the size of the overall apparatus.

In addition, since cord 77 for supplying power to said direct current brushless motor is on the stationary side, the rotary motion of linear motion table mechanism 42 is not subjected to restriction by this cord 77, thus enabling it to move freely without being entangled.

In addition, since the driving device in the form of a direct current brushless motor (composed of stator 51 and rotor 52) that rotates rotary table 47, and the driving force generation device in the form of direct current brushless motor 75 that generates the driving force for reciprocating linear motion table 63 are of the moving magnet type and their stators serve as the power supply side containing armature coils, the above-mentioned cord 54 is on the stationary side and cord 77 is also on the same stationary side.

Furthermore, in contrast to the above-mentioned motors of the moving magnet type, in the case of motors of the moving coil type, the rotor is on the power supply side. In this case, although the above-mentioned cords 54 and 77 do not obstruct rotary motion of linear motion table mechanism 42, a certain degree of limitation is placed on the rotary motion of rotary table 47 and direct current brushless motor 75.

In said positioning apparatus, the above-mentioned limitations on rotary motion can be avoided by having the stators of both motors on the power supply side.

With respect to the encoders provided on both motors of said positioning apparatus, since each of the detecting portions, namely sensors to which cords 58 and 81 are connected, are provided on the stationary side, these cords 58 and 81 are also on the stationary side, thus preventing them from restricting or having a detrimental effect on rotary motion.

Figure 6:
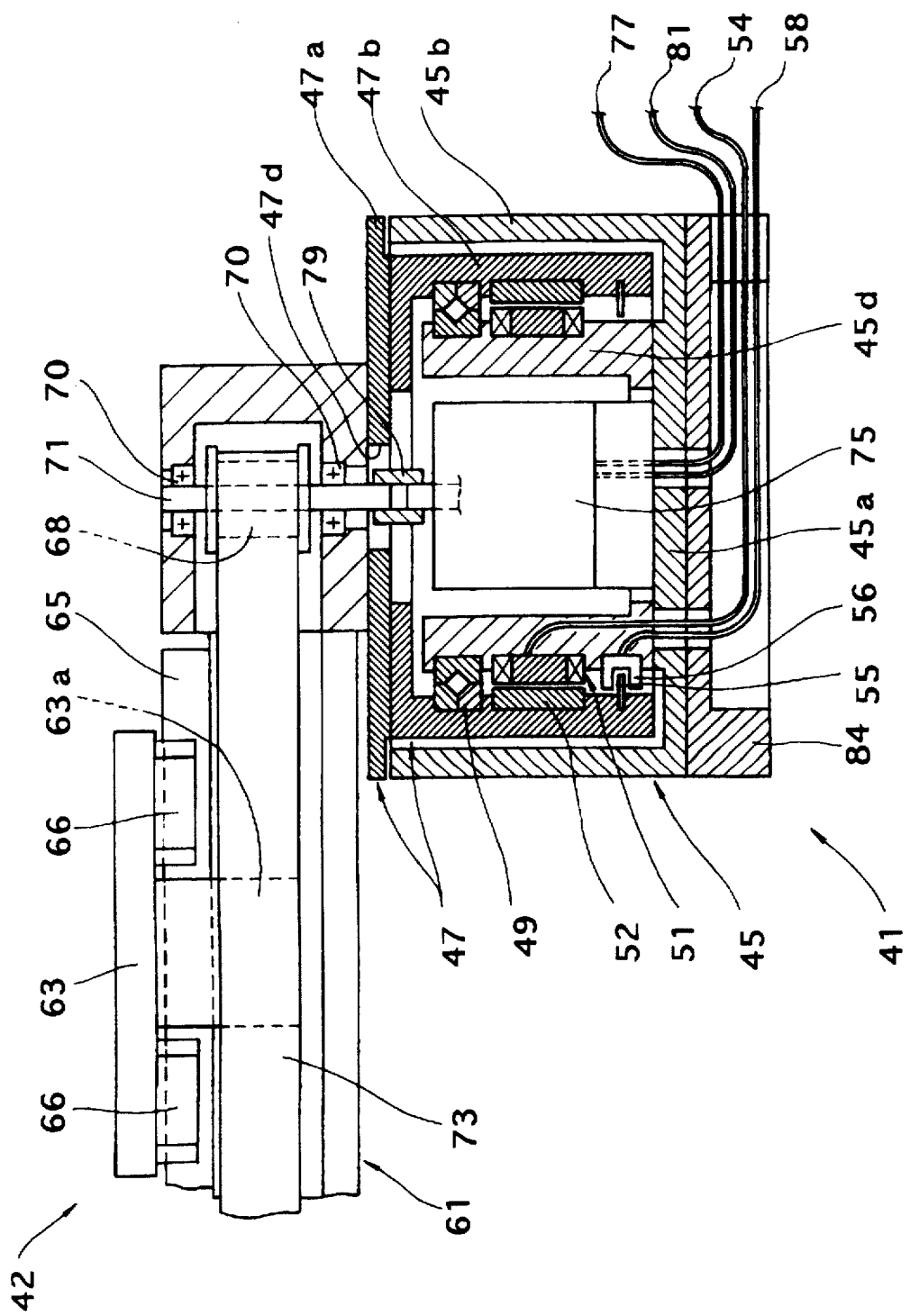
FIG. 6 is a longitudinal cross-sectional view of the essential portion of a positioning apparatus as a second embodiment of the present invention.

Next, the following provides an explanation of a positioning apparatus as a second embodiment of the present invention based on FIG. 6 that is able to demonstrate the same effects as the positioning apparatus of the first embodiment described above. However, since the positioning apparatus of this second embodiment is composed in the same manner as that of the above-mentioned first embodiment with the exception of the portions explained below, an explanation of the entire apparatus will be omitted to avoid duplication. Instead, the explanation will focus only on the essential portion.

In addition, the same reference numerals will be used in the following explanation and in FIG. 6 for those component portions that are identical or correspond to the above-mentioned positioning apparatus of the first embodiment.

Furthermore, this will apply similarly to the explanation of the third embodiment to be provided later.

As shown in FIG. 6, in this second embodiment, base portion 45 of rotary table mechanism 41 has inner wall portion 45d, and cylindrical portion 47b of rotary table 47 is inserted between this inner wall portion 45d and peripheral wall portion 45b. Stator 51 is installed on the outside of this inner wall portion 45d, and rotor 52 corresponding to this stator 51 is installed on the inside of said cylindrical portion 47b.

In addition, hollow base member 84 that holds rotary table mechanism 41 is provided, and cords 54, 58, 77 and 81 are passed through holes mutually inserted through the bottom of base portion 45 and said base member 84 and led into said base member 84 after which they are gathered together and pulled out to the side.

Figure 7:
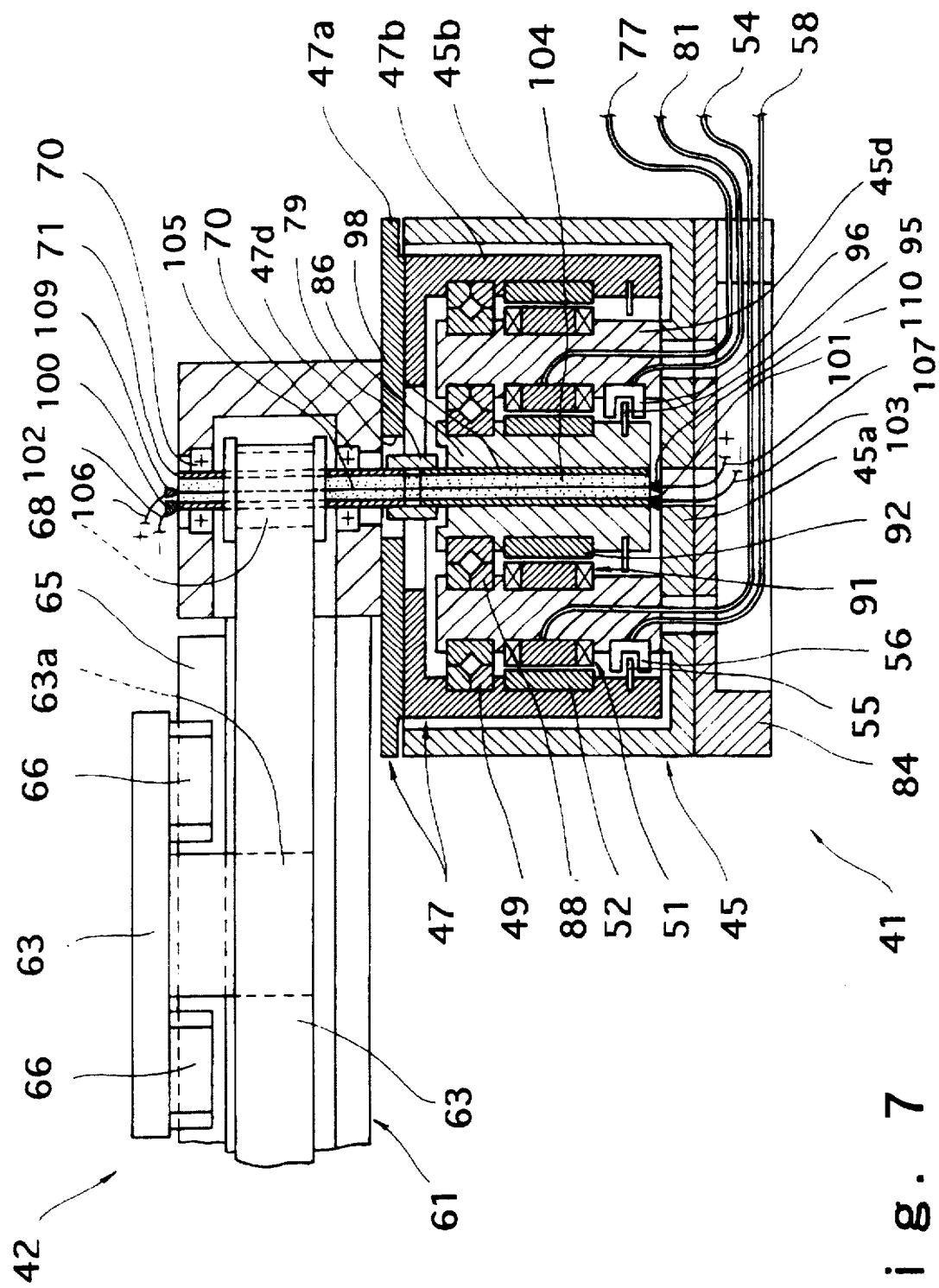
FIG. 7 is a longitudinal cross-sectional view of the essential portion of a positioning apparatus as a third embodiment of the present invention.

FIG. 7 shows the essential portion of a positioning apparatus as a third embodiment of the present invention.

In said positioning apparatus, a driving force generation device in the form of a motor that generates the driving force for reciprocating linear motion table 63 is composed in the manner described below.

Namely, a roughly cylindrical core 86 is arranged in the inner space of inner wall portion 45d possessed by base portion 45 of rotary table mechanism 41. This core 86 is supported so as to rotate freely by means of crossed roller bearing 88 on said inner wall portion 45d. Said motor is therefore composed by then respectively installing stator 91 and rotor 92 on the inside of said inner wall portion 45d and the outside of the above-mentioned core 86 so that they are mutually corresponding.

In addition, these stators 91 and rotor 92 are composed in the same manner as stator 51 and rotor 52 of the motor for rotating rotary table 47, with stator 91 containing armature coils and serving as the power supply side. In other words, said stator 91 and rotor 92 compose a moving magnet type of direct current brushless motor similar to the motor for rotating rotary table 47.

Furthermore, since the bearing of said motor is not subjected to a composite load including a relatively large moment load as in crossed roller bearing 49 of rotary table mechanism 41 provided on the outside of said inner wall portion 45d, it is only required to be that which is able to bear a radial load and axial load, and so it does not have to be a crossed roller bearing.

In addition, an address plate and sensor, indicated with reference numerals 95 and 96, respectively, are provided in said motor, and an encoder that detects the amount of rotation of said motor is composed by said address plate and sensor.

Furthermore, address plate 95 and sensor 96, which serve as a linear motion encoder, are composed in the same manner as address plate 55 and sensor 56 that serve as the encoder that detects the amount of rotation of the motor for rotating and driving rotary table 47.

A motor output shaft in the form of spindle 98 is attached to core 86 possessed by said motor. This spindle 98 is coupled with spindle 71 to which toothed belt pulley 68 is attached by coupling 79. These spindles 71 and 98 and coupling 79 are fabricated using an electrically conductive material and are hollow, enabling them to also be used as electrical transmission members.

Namely, brushes 100 and 101 from base portions 61 and 45, respectively, slide onto the ends of both spindles 71 and 98, and cords 102 and 103 are connected to these brushes 100 and 101. Electrical transmission member 105 is inserted into spindles 71 and 98 and coupling 79 in a non-contact state by means of insulator 104, and cords 106 and 107 are respectively connected to brushes 109 and 110 on both ends of said electrical transmission member 105 from base portions 61 and 45 in a similar manner.

In the above-mentioned constitution, for example, spindles 71 and 98 and coupling 79 serve as the negative side, while electrical transmission member 105 serves as the positive side. According to this constitution, for example, a signal from a limit sensor provided to confirm that linear motion table 63 has arrived at a movement limit position can be obtained, or if a work robot and so forth is placed on linear motion table 63, this constitution can be used to supply electrical power to said work robot and so forth. In addition, entangling of power transmission cords for these components caused by rotary operation of said positioning apparatus can be avoided.

Figure 8:
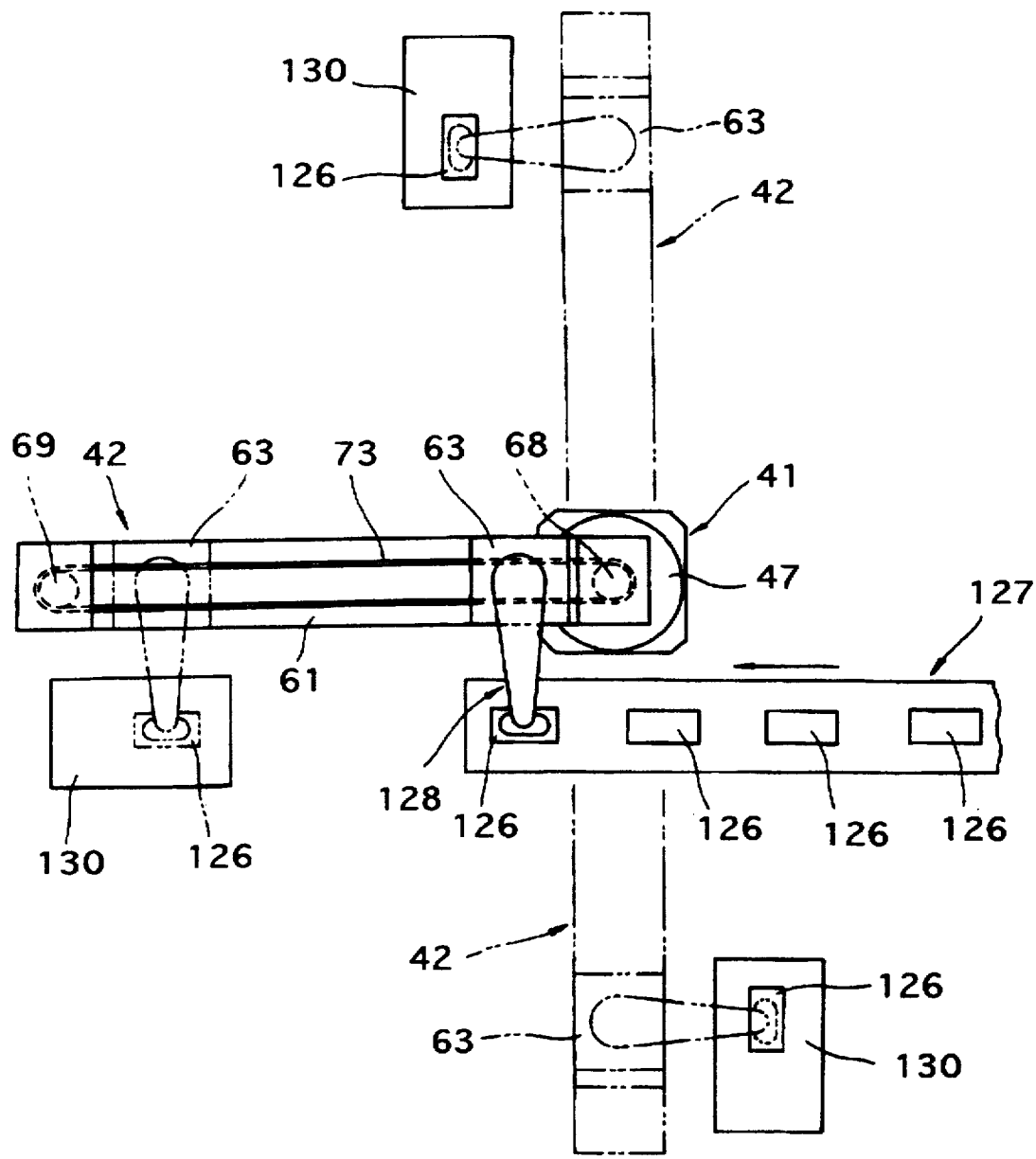
FIG. 8 is an overhead view showing the positioning apparatus of the present invention incorporated in a portion of a pick and place apparatus.

Here, an explanation is provided of a usage example of the positioning apparatuses of each of the above-mentioned embodiments based on FIG. 8.

FIG. 8 is an overhead view of the state in which the positioning apparatus as claimed in the present invention is incorporated as a component of a pick & place apparatus. In this drawing, the objects on which work is to be performed in the form of workpieces 126 are sequentially carried in by a belt conveyor 127 located to the side of said positioning apparatus. A suction arm 128 for suctioning and releasing workpieces is attached on linear motion table 63 of said positioning apparatus.

As shown in the drawing, rotary table 47 of rotary table mechanism 41 is intermittently rotated by, for example, 90°, linear motion table 63 of linear motion table mechanism 42 is suitably reciprocated, and workpieces are suctioned and released by suction arm 128. As a result, workpieces 126 on belt conveyor 127 are transported on each work bench 130. Thus, workpieces 126 are positioned and guided to arbitrary positions within the rotating plane by said positioning apparatus.

Figure 9A:
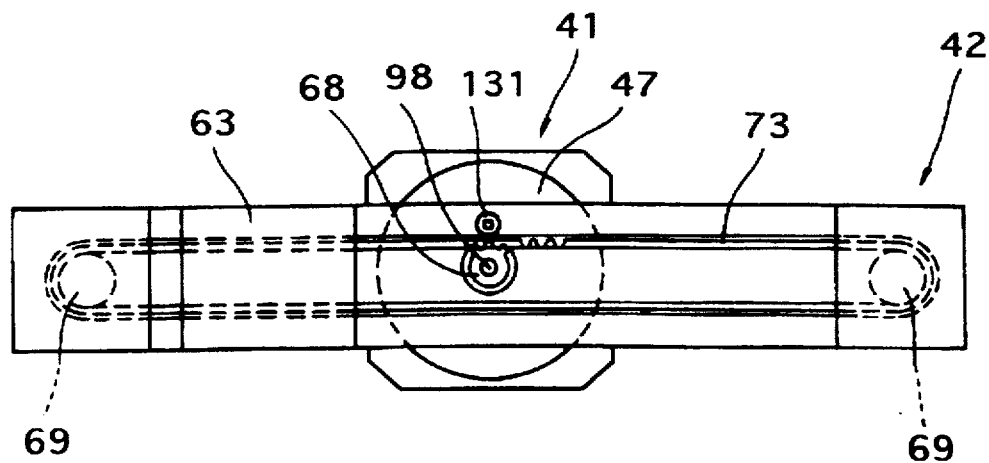
FIG. 9 is a drawing showing a positioning apparatus composed of a linear table apparatus in the center mounted on a rotary table mechanism.
Figure 9B:
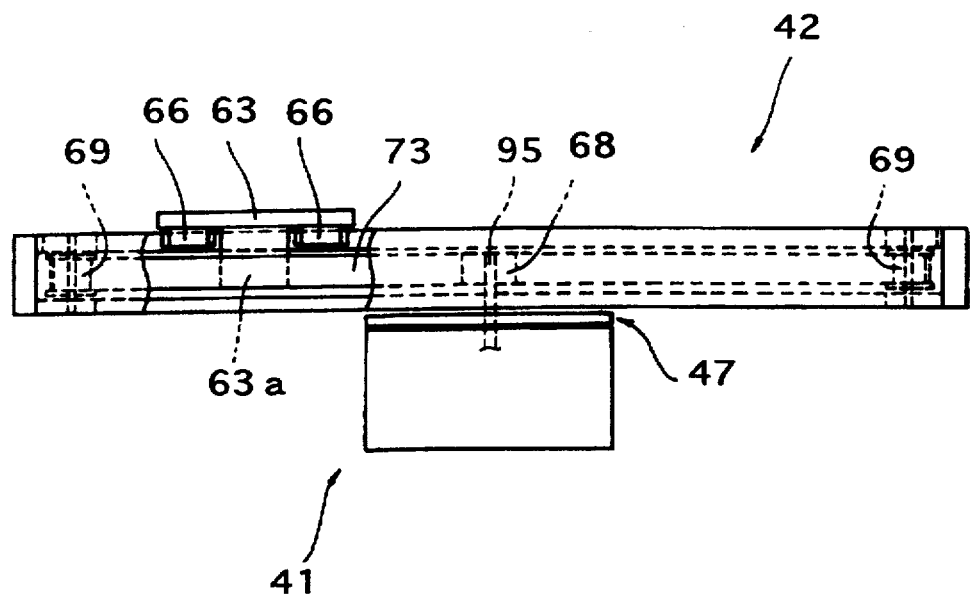

In the positioning apparatuses of the first through third embodiments described above, although linear motion table mechanism 42 is mounted on rotary table 47 in cantilever fashion, in consideration of the weight balance of the overall apparatus, linear motion table mechanism 42 may be provided on rotary table 47 at its central portion as shown in FIG. 9 (a) and (b). In this case, toothed belt pulley 68 on the driving side is attached to spindle 98 of the motor, and belt clamping roller 131 is provided that applies pressure so that toothed belt 73 does not come off of said toothed belt pulley 68.

Figure 10:
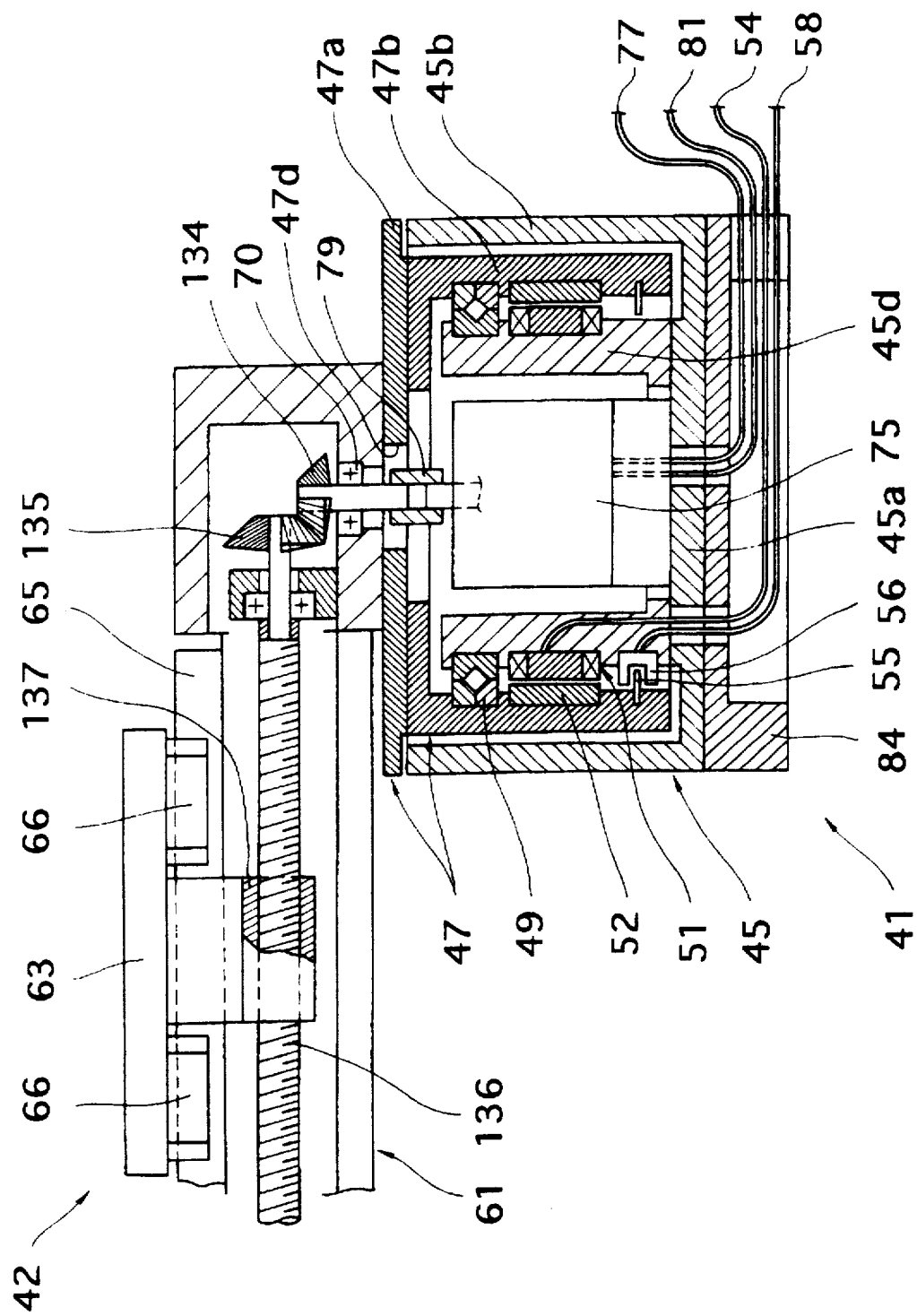
FIG. 10 is a longitudinal cross-sectional view of the essential portion of a positioning apparatus equipped with a variation of a transmission device that transmits driving force.

In addition, although the transmission device that transmits driving force from a driving force generation device in the form of a motor to linear motion table 63 is composed of toothed belt pulleys 68 and 69 and toothed belt 73 in each of the above-mentioned embodiments, as shown in FIG. 10, the use of bevel gears 134 and 135 enables this transmission device to be replaced with threaded shaft 136 and nut 137.

As has been explained above, in the positioning apparatus according to the present invention, a driving force generation device, and more specifically a motor, which generates driving force to be applied to a linear motion table of a linear motion table mechanism, is arranged within the base portion of a rotary table mechanism. Thus, the motor does not protrude from the end of the linear motion table mechanism as in the prior art, making it easy to reduce the overall size of the apparatus.

In addition, as a result of the above-mentioned driving force generation device being arranged within the base portion of the above-mentioned rotary table mechanism, the cord for supplying power to the above-mentioned motor is on the stationary side, thereby enabling the linear motion table mechanism to move freely without its rotary motion being restricted by the above-mentioned cord even during its rotation, and enabling an object to be positioned and guided to an arbitrary position within the rotating plane.

What is claimed is:

1. A positioning apparatus equipped with a rotary table mechanism and a linear motion table mechanism;

said rotary table mechanism having a first base portion, a rotary table inserted into said first base portion so as to rotate freely, and a driving device that rotates said rotary table; and said linear motion table mechanism having a second base portion, a linear motion table attached to said second base portion that performs linear motion so as to reciprocate freely, a driving force generation device that generates driving force for reciprocating said linear motion table, and a transmission device that transmits said driving force to said linear motion table; wherein, said second base portion is mounted on said rotary table, and said driving force generation device is arranged within said first base portion.

2. A positioning apparatus as set forth in claim 1 wherein said driving device and said driving force generation device are motors composed of a rotor and stator, and said stator serves as the power supply side.

3. A positioning apparatus as set forth in claim 2 provided with an encoder for detecting the amount of rotation and so forth of said motor and having a detecting portion and a detected portion, said detected portion being provided on the stationary side.

4. A positioning apparatus as set forth in claim 1 wherein said rotary table is attached by means of a crossed roller bearing to said first base portion.

5. A positioning apparatus equipped with a rotary table mechanism and a linear motion table mechanism, and comprising:

a driving device that rotates said rotary table, a first encoder that detects the amount of rotation and so forth of said rotary table, a driving force generation device that generates driving force for reciprocating said linear motion table of said linear motion table mechanism, a second encoder that detects the amount of rotation and so forth of said driving force generating device, a signal generation device that generates signals for driving said driving device and said driving force generating device, and a frequency conversion device that converts the signals generated from said signal generation device for driving said driving device into signals corresponding to the resolution of said second encoder.

\* \* \* \* \*